US005821269A

United States Patent [19]

Blumberg

[11] Patent Number: 5,821,269

[45] Date of Patent: Oct. 13, 1998

[54] TREATED BIRD SEED PREFERENTIALLY PALATABLE TO BIRDS BUT NOT PALATABLE TO ANIMALS HAVING CAPSAICIN SENSITIVE RECEPTORS

[75] Inventor: Peter M. Blumberg, Frederick, Md.

[73] Assignee: The United States of America as represented by the Department of Health and Human Services, Washington, D.C.

[21] Appl. No.: 892,484

[22] Filed: Jun. 3, 1992

Related U.S. Application Data

[63] Continuation of Ser. No. 574,159, Aug. 29, 1990, abandoned.

[51] Int. Cl.[6] .......... A23K 1/18

[52] U.S. Cl. .......... 514/918; 426/805; 514/627

[58] Field of Search .......... 424/405, 406; 106/2; 426/807; 514/627, 920

[56] References Cited

U.S. PATENT DOCUMENTS

| | | | |
|---|---|---|---|
| 321,909 | 7/1885 | Myers | 426/805 X |
| 631,738 | 8/1899 | Dowie | 424/601 |
| 779,634 | 1/1905 | Allen | 424/195.1 |
| 826,990 | 7/1906 | Cartwright | 426/805 X |
| 3,080,285 | 3/1963 | Odenwald et al. | 424/410 |
| 4,161,543 | 7/1979 | Glabe et al. | 426/2 |
| 4,455,304 | 6/1984 | Yaralian | 424/195.1 |
| 4,775,532 | 10/1988 | Clayton | 424/195.1 |
| 4,795,637 | 1/1989 | Harding, Jr. | 424/410 |
| 4,939,149 | 7/1990 | Blumberg | 514/691 |

OTHER PUBLICATIONS

Windholz et al, The Merck Index, Tenth Edition, (1983) pp. 243–244, 1741.

Life Sciences, vol. 34, pp. 1241–1248; "The Effects of a Series of Capsaicin Analogues on Nociception and Body Temperature of the Rat"; Ann G. Hayes et al.; Jan. 17, 1984; Pergamon Press Ltd.

Szolcsanyi et al, *Pain*, 27 (1986) 247–260.

Szallasi et al, *Neuroscience*, vol. 30, No. 2, pp. 515–520.

Monsereevsorn et al (1982) *CRC Crit. Rev. Toxicol*, vol. 10, pp. 321–339.

Szallasi et al, *Brain Research*, O (1990) pp. 1–6.

Rozin, P. and Schiller, D., "The nature and acquisition of a preference for chili pepper by humans", *Motiv. Emot.* 4, pp. 77–101 (1980).

Sann, H., Harti, G., Pierau, F.K., and Simon, E., "Effect of capsaicin upon afferent and efferent mechanism of nociception and temperature regulation in birds", *Can. J. Physiol. Pharmacol*, 65: 1347–1354 (1987).

Newman (1954) *Chemical Products* and Hayes et al *Life Sciences*.

*Webster's New World Dictionary of American English* Third College Edition (1988), Victoria Neufeldt Ed. in Chief, Simon & Schuster p. 142.

Rozin, Paul, et al, "Reversal of Innate Aversions; Attempts to Induce a Preference for Chili Peppers in Rats", *J. Comp. Physio. Phychol.*, 93, No. 6, pp. 1001–1014.

New Riverside U. Dictionary, p. 227 (Copyright 1984/8 Houghton Mufflin Co., Boston, MA.

*Primary Examiner*—S. Mark Clardy
*Assistant Examiner*—Robert H. Harrison
*Attorney, Agent, or Firm*—Henry D. Coleman; R. Neil Sudol

[57] ABSTRACT

The present invention is directed to preparations of birdseed treated with capsaicin or capsaicin derivatives or analogs thereof in an amount sufficient to be unpalatable to animals having capsaicin sensitive receptors, and more specifically to mammals such as rodents. These "hot" compounds, extracts or whole plant material containing these compounds may be coated on, impregnated in or combined (e.g., mixed) with birdseed to repel troublesome mammals which recognize these compounds as "hot". These "hot" compounds, in contrast, will not repel birds because birds do not recognize these compounds as "hot" since they do not have capsaicin sensitive receptors. The invention is further directed to a method of selectively repelling animals having capsaicin sensitive receptors, which comprises feeding the treated birdseed of the invention to birds, in an amount effective for repelling animals having capsaicin sensitive receptors, thereby discouraging said animals from eating the treated birdseed.

5 Claims, No Drawings

TREATED BIRD SEED PREFERENTIALLY PALATABLE TO BIRDS BUT NOT PALATABLE TO ANIMALS HAVING CAPSAICIN SENSITIVE RECEPTORS

This application is a continuation of application Ser. No. 07/574,159 filed on Aug. 29, 1990, now abandoned.

BACKGROUND OF THE INVENTION

1. Field of the Invention

The present invention relates to preparations of bird seed treated with a material containing capsaicin or capsaicin derivatives or analogues thereof (including resiniferatoxin (RTX) or RTX analogues) in an amount sufficient to be unpalatable to mammals (e.g., rodents), which have capsaicin receptors.

2. Description of Related Art

U.S. Pat. No. 779,634 by Allen discloses a poison composition for the extermination of rodents which are destructive to crops. The poison comprises one pound of cayenne pepper, three (3) gallons of bisulfid of carbon, and one gallon of carbolic acid. A piece of absorbent material is saturated with the preparation and placed in locations frequented by unwanted rodents.

U.S. Pat. No. 631,738 by Dowie discloses a powdered composition for expelling rats consisting of twenty percent chili pepper, five percent hellebore, eight percent sulphate of lime, eight percent phosphate of lime, fifty four percent carbonate of lime and five percent oxide of iron. The powdered composition is intended to be sprinkled on the premises where rats are troublesome, and as a result of its intense irritating and burning qualities effectually prevents the rats from again invading places where the composition has been used. The hellebore and pepper are mixed with a medium to form a very light powder so as to float on the air and permeate the areas where the rats may be. It is said to be impossible to use hellebore without the pepper as it would be unbearable to human beings distributing it.

U.S. Pat. No. 4,455,304 by Yaralian discloses a method and composition for repelling birds from crops by applying the composition in the vicinity of the crop to be treated. The composition comprises finely divided garlic and finely divided dried cayenne pepper, the garlic being present in at least about one-fifth to at least five times the weight of the pepper, dry weight, and the total amount of garlic and pepper applied being from at least about 0.37 to 3.7 kilograms per hectare.

Szolcsanyi et al, *Pain,* 27 (1986) 247–260, discloses the sensitivity of birds to the nociceptive action of capsaicin differs from that of mammals. This was investigated by local instillation of capsaicin into the eye and by close arterial injection in pigeons and guinea-pigs. More specifically, instillation of capsaicin into the eyes of the pigeons did not evoke more reactions than the solvent alone. Thus, pigeons were found to reveal selective insensitivity to capsaicin and the peripheral chemoreceptive nerve endings in pigeons are almost totally insensitive to capsaicin.

Capsaicin and its analogues have been commercially used as repellents, such as in "HALT," an aerosol preparation sold to repel attacking dogs.

Monsereenvsorn et al (1982) CRC Crit. Rev. Toxicol. 10, 321–339, discloses the physical and chemical properties of capsaicin.

Rozin, P. and Schiller, D., "The nature and acquisition of a preference for chili pepper by humans", *Motiv. Emot.* 4, 77–101, 1980, teaches that the maximum tolerated dose of chili pepper for humans is between 1,300 Scoville units (1 part in $1.25\times10^4$ of capsaicin) and 10,400 Scoville units (1 part in $1.5\times10^3$ of capsaicin).

Rozin, P. and Gruss, L., and Berk, G., "Reversal of innate aversions: attempts to induce a preference for chili peppers in rats", *J. Comp. Physio. Psychol.* 93, 1001–1014, 1979, teaches that incorporation of chili pepper in the feed of rats at a level of 400 Scoville units (corresponding to 1 part capsaicin in 40,000) causes 95% rejection of the treated food relative to untreated food. The report further teaches that the geometric mean for the avoidance threshold is 1 part capsaicin in $1.5\times10^6$ and that all animals (out of 12 tested) avoided the treated feed at an avoidance threshold of 1 part capsaicin in 25,000 in the feed.

Sann, H., Harti, G., Pierau, F. K., and Simon, E., "Effect of capsaicin upon afferent and efferent mechanism of nociception and temperature regulation in birds", *Can. J. Physiol. Pharmacol.* 65: 1347–1354, 1987, teaches that the acute capsaicin effects on nociception in chickens upon close arterial injection were only observed at a dose two to three orders of magnitude higher than that in mammals.

SUMMARY OF THE INVENTION

The present invention is directed to preparations of birdseed treated with a material containing capsaicin, including capsaicin per se, or capsaicin derivatives or analogues thereof in an amount sufficient to be unpalatable to animals having capsaicin sensitive receptors, and more specifically to mammals such as rodents. These "hot" compounds, extracts or whole plant material containing these compounds may be coated on, impregnated in or combined with birdseed to repel troublesome mammals which recognize these compounds as "hot". These "hot" compounds, in contrast, will not repel birds because birds do not recognize these compounds as "hot" since they do not have capsaicin sensitive receptors. The invention is further directed to a method of selectively repelling animals having capsaicin sensitive receptors, which comprises feeding the treated birdseed of the invention to birds, in an amount effective for repelling animals having capsaicin sensitive receptors, thereby discouraging said animals from eating the treated birdseed.

DETAILED DESCRIPTION OF THE INVENTION

Birdseed for feeding wild birds represents a significant economic product. The annual value of birdseed production in the U.S. in 1987 was $67.9 million. (U.S. Department of Commerce) A birdseed which is palatable to birds but which is unpalatable to rodents would better meet the needs of two categories of consumers. First, many bird-lovers apparently object to squirrels consuming the birdseed, as evidenced by the abundance of advertisements for squirrel-proof bird feeders. Such feeders represent only a partial solution to the problem, since the squirrels still consume the seed which is knocked out of the feeder and falls on the ground. Second, most birdfeeders are located near houses, and the fallen seed provides feed for mice. This causes an elevated mouse population in and around dwellings. Borreliosis (Lyme disease) represents a major health concern in rural and outlying suburban areas. The vector for borreliosis is the larval stage of the deer tick (*Ixodes dammini*) and the predominant host is the white footed mouse. Use of a birdseed unpalatable to the white footed mouse might represent one aspect of rodent control.

The inventor has been involved in the study of the mechanism of action of resiniferatoxin, a phorbol related diterpene, and has demonstrated that resiniferatoxin acts as a potent analog of capsaicin, the pungent ingredient in chili peppers (A. Szallasi and P. M. Blumberg, *Neuroscience,* Vol. 30, No. 2, pp. 515–520, 1989). As part of the analysis of resiniferatoxin receptors, the present inventor examined the species specificity of the resiniferatoxin receptors, and became aware of the literature that capsaicin is only pungent, i.e., "hot", for mammals but not for birds. The inventor has also demonstrated experimentally that capsaicin receptors are not detectable in birds such as chickens, in contrast to mammals (data not shown).

Accordingly, the present invention is directed to treated birdseed, which comprises birdseed that is treated (e.g., coated, impregnated, mixed) with an effective amount of a material containing capsaicin or a derivative or an analogue thereof for repelling animals having capsaicin sensitive receptors by discouraging said animals from eating the treated "hot" birdseed, with the proviso that the treated birdseed does not have effective amounts of other ingredients that would repel the birds. In other words, the claimed composition may contain additional material except for material that would repel the birds from the birdseed or that would kill the birds or make them sick. Examples of compounds that would repel birds when used in sufficient quantity include garlic, wattle tannin, aluminum ammonium sulfate, dimethyl anthranilate, and methiocarb [3,5-dimethyl-4-(methylthio)-phenol methylcarbamate]. Examples of compounds that would kill the birds or make them sick include poisons or caustic substances. Small trace amounts of these compounds that are typically used to repel or kill the birds may be present as long as the birds are not adversely affected by such trace amounts.

The term "birdseed" as used herein refers to any food or food additive or material that a bird would eat. Representative types of birdseed include but are not limited to sunflower seeds, millet, barley, oats, wheat, corn, peanuts, thistle seed, sorghum, sudan grass seed, watergrass seed and clover seed. Other types of food encompassed by the term "birdseed" of the invention include materials such as suet or pellet feeds.

Individual seed types or mixtures of seed are treated with capsaicin or derivatives or analogues thereof, including dihydrocapsaicin, homovanillyl octylester, nonanoyl vanillylamide, or other pungent compounds of the class known as vanilloids. Other capsaicin analogues having the desired "hot" properties include resiniferatoxin, tinyatoxin, or other related resiniferatoxin analogues. This latter class of compounds has been demonstrated to act in the same fashion as capsaicin. Additional types of capsaicin derivatives or analogues include heptanoyl isobutylamide, heptanoyl guaiacylamide, or other isobutylamides or guaiacylamides. All of these compounds are representative of capsaicin derivatives or analogues, that is, those compounds which are "hot" to animals having capsaicin sensitive receptors but are palatable to birds which do not have such receptors. Capsaicin derivatives or analogues per se are well known in the art. Representative types of capsaicin derivatives or analogues suitable for use in the present invention are described in a collective list set forth by Newman, "Natural and synthetic pepper flavored substances", *Chemical Products,* 1954; and Hayes et al "The effect of a series of capsaicin analogues on nociception and body temperature in the rat", *Life Sciences,* Vol. 34, pp. 1241–1248.

The preferred types of capsaicin derivatives are selected from the group consisting of dihydrocapsaicin, nonanoyl vanillylamide and homovanillyl nonylester. The proportions of capsaicin or capsaicin derivatives or analogues to seed should be in the range of 1 part in 200 to 1 part in 2,000,000 by weight. Preferably, the proportions should be 1 part in 2000 to 1 part in 100,000. For resiniferatoxin, the proportions of RTX should be 1 part in 2000 to 1 part in 20,000,000,000. Preferably, the proportions should be 1 part in 20,000 to 1 part in 20,000,000.

The material containing capsaicin or a derivative or an analogue thereof can be either mixed with the birdseed, impregnated in, or coated thereon. The compounds can be applied to the seed by a variety of coating methods, e.g., soaking, spraying, mixing, after dissolving in an organic solvent such as ethanol or methanol or in a mixture of solvents containing ethanol or methanol and water and detergent, e.g., Triton X-100 or Tween-80, or in such solvents together with a coating agent or binder, e.g., starch, dextrin, gelatin, methyl cellulose, acacia, or sodium alginate. These coating agents are preferably present in the amount of 5–20% in the coating solution.

The types of animals which are discouraged from eating birdseed are typically mammals such as rodents and more specifically, squirrels, mice or rats.

In place of treatment with the purified or partially purified compounds, the seed may be treated with plant material, sap or extracts from such plants which contain either capsaicin, resiniferatoxin or other capsaicin analogues. These plants are, respectively, "hot peppers" of the genus Capsicum, or one of the three Euphorbia species *E. resiniferatoxin, E. poissonii,* and *E. unispina.* The compounds in the Capsicum genus are concentrated in the fruits, or peppers. The compounds in the Euphorbias species are concentrated in the sap or latex. The recommended procedure would therefore be to use the peppers or latex, although the invention is not restricted to their use. Since the approximate concentration of capsaicin is 0.5 to 5% in the dried pepper and the concentration of resiniferatoxin in the dried sap of the above euphorbias is 0.05%, the proportions should be adjusted according to the amount of active ingredient. Accordingly, in a preferred embodiment, ground red peppers may be mixed with or coated on and/or impregnated in the birdseed.

If the compounds are partially purified such as by extraction of the plant material with methanol, the proportions should again be adjusted to maintain an effective amount of active ingredient for repelling animals having capsaicin sensitive receptors. A procedure for extraction of resiniferatoxin is described in Schmidt, R. J. and Evans, F. J., "A new aromatic ester diterpene from *Euphorbia poisonii", Phytochemistry* 15: 1778–1779, 1976. Among other methods, capsaicin can be extracted by incubation of the ground peppers with 2 volumes of methanol for 24 hr. at room temperature followed by filtration.

The structure of capsaicin and representative analogues and derivatives thereof are shown below.

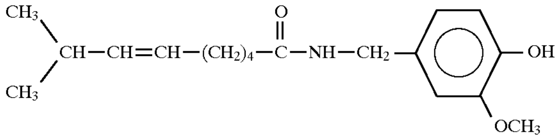

Capsaicin

-continued
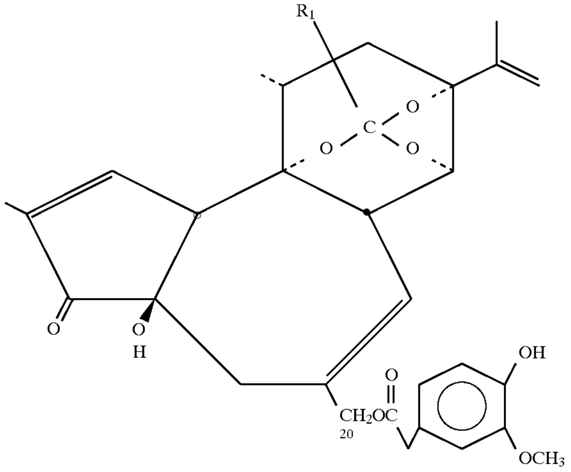
Resiniferatoxin
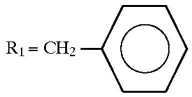
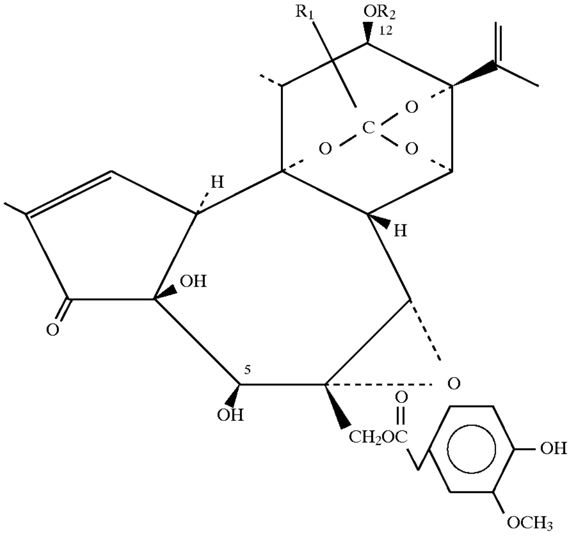
20-homovanillyl-mezerein
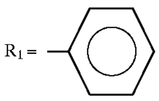
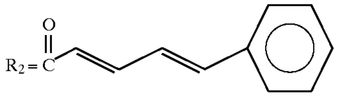
-continued
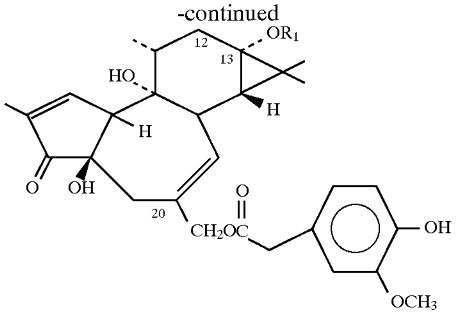
20-homovanillyl-12-deoxyphorbol 13-phenylacetate
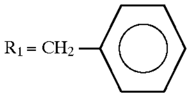
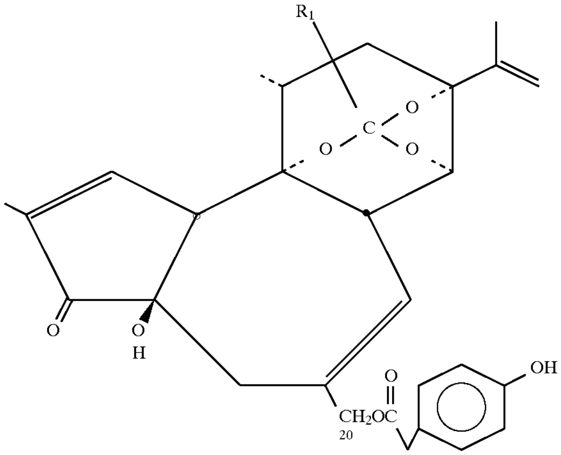
Tinyatoxin
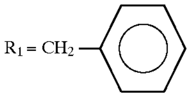
Additional examples of capsaicin derivatives are as follows.
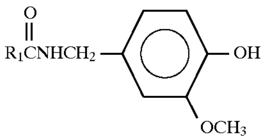
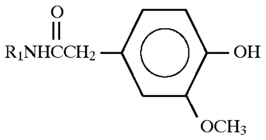
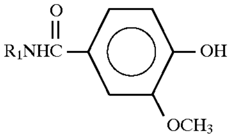
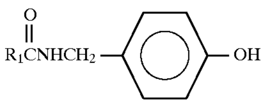

-continued

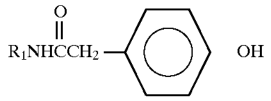

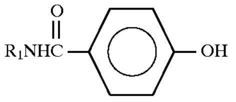

wherein $R_1 = C_nH_{2(n-i)+1}$ where n=1–20 i=0–4

U.S. Pat. No. 4,939,149 as well as U.S. Ser. No. 07/358,073 filed May 30, 1989 are hereby incorporated by reference and describe various types of capsaicin derivatives or analogues within the scope of the present invention. These compounds include those represented by formulas (I)–(IV):

I

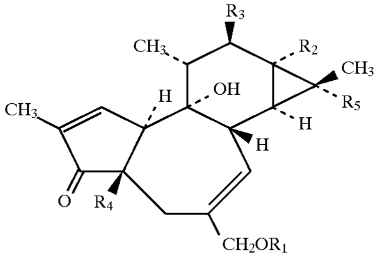

II

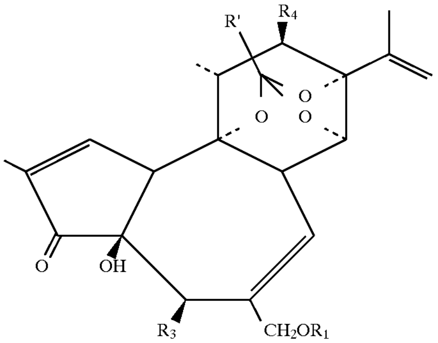

III

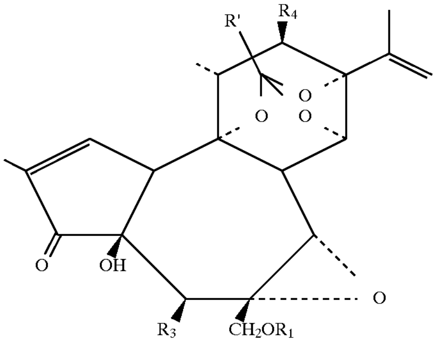

-continued

IV

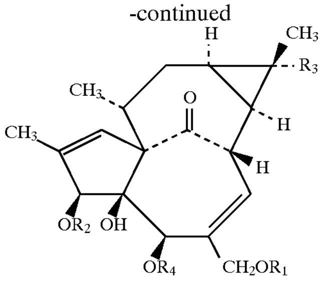

wherein $R_1$ in all cases represents

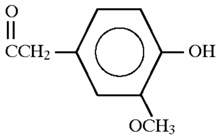

to yield 20-homovanillyl esters of diterpenes of the tigliane (I), daphnane (II and III), and ingenane (IV) classes.

Specific substitutions are as follows:

I: $R_2 = O\overset{O}{\overset{\|}{C}}R'$ $R_3 = H$ or $O\overset{O}{\overset{\|}{C}}R''$ $R_4 = H$ or OH $R_5 = CH_3$ or $CH_2O\overset{O}{\overset{\|}{C}}R'''$ wherein at least one of R', R", or R'" are aromatic and the remainder are $(CH_2)_{n'}$—$CH_3$ wherein n' is 0–14. For instance, the aromatic group may be

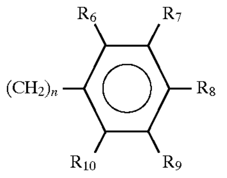

wherein $R_6$–$R_{10}$ each independently may represent OH, $OCH_3$ or H and wherein n is 0–10. Preferably, the aromatic group is

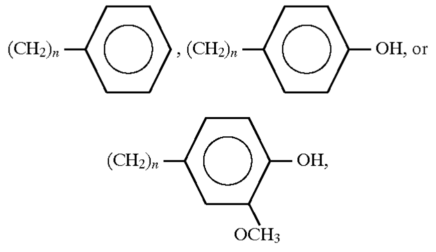

(wherein n=0–10)

II and III:

R' is aromatic as defined above;

$R_3$ is H, OH or $$\overset{O}{\overset{\|}{OCR''}}$$

where R" is aromatic as defined above, $R_4$ is H or $$\overset{O}{\overset{\|}{OCR'''}}$$

where R'" is aromatic as defined above.

$$\text{IV:}\quad R_2 = \overset{O}{\overset{\|}{CR'}}$$

$$R_3 = CH_3 \text{ or } CH_2\overset{O}{\overset{\|}{OCR''}}$$

$$R_4 = H \text{ or } \overset{O}{\overset{\|}{CR'''}}$$

where R', R", or R'" is aromatic as defined above.

Representative examples of compounds of formulas (I)–(IV) include 20-homovanillyl-mezerein and 20-homovanillyl-12-deoxyphorbol-13-phenylacetate.

The invention is further directed to compounds produced by the process of reacting phorbol-related diterpenes and homovanillic acid by esterification at the exocyclic hydroxy group of the diterpene.

Furthermore, esterification of phorbol-related diterpenes with homovanillic acid can yield capsaicin analogues with unique activities. Accordingly, the invention is directed to compounds produced by the process of reacting phorbol-related diterpenes and homovanillic acid by esterification at the exocyclic hydroxy group of the diterpene. Representative examples of the phorbol-related diterpenes are:

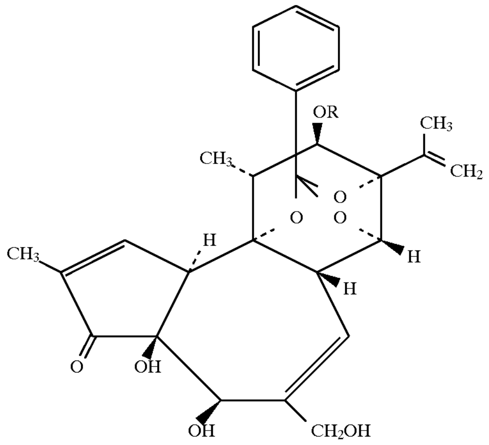

R = OC(CH=CH)$_2$C$_6$H$_5$

Mezerein

-continued

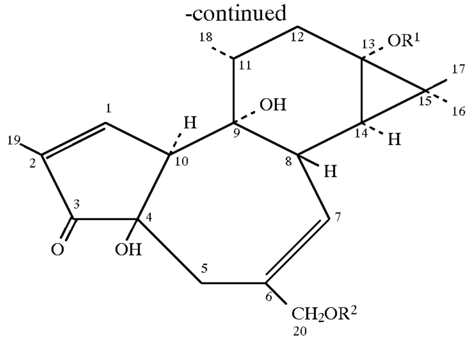

$R_1 = COCH_2C_6H_5$ $R_2 = H$ 12-deoxyphorbol 13-phenylacetate

The phorbol related diterpenes may be selected from the group consisting of tiglianes, daphnanes or ingenanes.

Representative examples of homovanillic acid and congeners are:

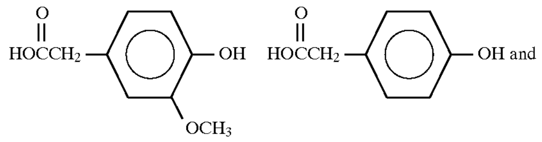

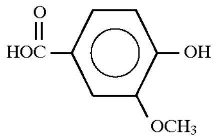

Homovanillic acid itself or congeners possessing a pattern of substitution which would confer capsaicin-like activity were it in a capsaicin-like structure may also be used.

The compounds of the invention, RTX and TTX may be prepared using the methodology for esterification as set forth in *J. Natural Prod.* Vol. 45, p. 348 (1982).

The following Examples are intended to illustrate the claimed invention and will enable others skilled in the art to understand the invention more completely. However, the invention should not be interpreted as being limited to only these representative examples.

EXAMPLE 1

10 kilograms of mixed seed, including 2 kilograms each of sunflower seed, millet, sorghum, oats and rye are thoroughly mixed with a suspension of 100 g powdered cayenne pepper (40,000 Scoville units) in 750 ml of 2% methylcellulose. After mixing, the treated seed is air dried.

EXAMPLE 2

5 kilograms of millet is moistened with 500 ml of 95% ethanol containing 125 mg dihydrocapsaicin. The seed is warmed to 40° C. under reduced pressure with agitation until dry.

All publications including U.S. patents and literature references as well as all copending patent applications referred to in this application are herein incorporated by reference.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What I claim is:

1. Treated birdseed for wild birds, comprising:

(i) whole seed selected from the group consisting of sunflower seeds, millet, barley, oats, wheat, corn, peanuts, thistle seed, sorghum, sudan grass seed, watergrass seed, clover seed and mixtures thereof, and (ii) a material containing capsaicin or a derivative or an analogue thereof coated on, impregnated in or mixed with said birdseed in a ratio of about 1 part in 200 to about 1 part in 100,000 by weight, for repelling animals having capsaicin sensitive receptors from eating said treated birdseed, with the proviso that said treated birdseed does not have effective amounts of other ingredients that would repel wild birds.

2. A method of selectively repelling animals having capsaicin sensitive receptors, which comprises feeding said treated birdseed of claim 1 to birds in an amount effective for repelling animals having capsaicin sensitive receptors from eating said treated whole birdseed.

3. The method according to claim 2, wherein the proportion of the material containing capsaicin or a derivative or an analogue thereof to seed in said birdseed ranges from about 1 part in 200 to 1 part in 10,000 by weight.

4. A method of selectively repelling animals having capsaicin sensitive receptors, which comprises feeding treated birdseed to birds in an amount effective for repelling animals having capsaicin sensitive receptors from eating said treated birdseed, said treated birdseed comprising:

(i) birdseed selected from the group consisting of sunflower seeds, millet, barley, oats, wheat, corn, peanuts, thistle seed, sorghum, sudan grass seed, watergrass seed, clover seed and mixtures thereof, and (ii) an effective amount of a material containing capsaicin or a derivative or an analogue thereof coated on, impregnated in or mixed with said birdseed in a ratio of about 1 part in 200 to about 1 part in 100,000 by weight, for repelling animals having capsaicin sensitive receptors from eating said treated birdseed, with the proviso that said treated birdseed does not have effective amounts of other ingredients that would repel birds.

5. The method according to claim 4, wherein the proportion of the material containing capsaicin or a derivative or an analogue thereof to seed in said birdseed ranges from about 1 part in 200 to 1 part in 10,000 by weight.

* * * * *

US005821269B1

(12) REEXAMINATION CERTIFICATE (4417th)

United States Patent

Blumberg

(10) Number: US 5,821,269 C1

(45) Certificate Issued: Aug. 14, 2001

(54) TREATED BIRD SEED PREFERENTIALLY PALATABLE TO BIRDS BUT NOT PALATABLE TO ANIMALS HAVING CAPSAICIN SENSITIVE RECEPTORS

(75) Inventor: Peter M. Blumberg, Frederick, MD (US)

(73) Assignee: The United States of America as represented by the Department of Health and Human Services, Washington, DC (US)

Reexamination Request:
No. 90/005,310, Mar. 31, 1999

Reexamination Certificate for:

| | |
|---|---|
| Patent No.: | **5,821,269** |
| Issued: | **Oct. 13, 1998** |
| Appl. No.: | **07/892,484** |
| Filed: | **Jun. 3, 1992** |

Related U.S. Application Data

(63) Continuation of application No. 07/514,159, filed on Aug. 29, 1990, now abandoned.

(51) Int. Cl.$^{7}$ .......... A23K 1/18

(52) U.S. Cl. .......... 424/760; 424/442; 426/805; 514/627

(58) Field of Search .......... 424/442, 760, 424/405, 406; 106/2; 426/805, 807; 514/627, 920

(56) References Cited

U.S. PATENT DOCUMENTS 4,128,640 * 12/1978 Klein .......... 424/195.1
4,197,293 * 4/1980 Klein .......... 424/195.1
4,197,294 * 4/1980 Klein .......... 424/195.1

OTHER PUBLICATIONS

Chalupa et al. 'Development of Diets for Food–Producing Animals.' In: Flavor Chemistry of Animal Foods, ACS Symposium Series 67. Edited by R.W. Bullard. 1978, pp. 129–140.*

Kirk–Othmer Encyclopedia of Chemical Technology, 3rd Edition. vol. 10. 1978, p. 479.*

* cited by examiner

*Primary Examiner*—Robert H. Harrison

(57) ABSTRACT

The present invention is directed to preparations of birdseed treated with capsaicin or capsaicin derivatives of analogs thereof in an amount sufficient to be unpalatable to animals having capsaicin sensitive receptors, and more specifically to mammals such as rodents. These "hot" compounds, extracts or whole plant material containing these compounds may be coated on, impregnated in or combined (e.g., mixed) with birdseed to repel troublesome mammals which recognize these compounds as "hot". These "hot" compounds, in contrast, will not repel birds because birds do not recognize these compounds as "hot" since they do not have capsaicin sensitive receptors. The invention is further directed to a method of selectively repelling animals having capsaicin sensitive receptors, which comprises feeding the treated birdseed of the invention to birds, in an amount effective for repelling animals having capsaicin sensitive receptors, thereby discouraging said animals from eating the treated birdseed.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–5 is confirmed.

New claims 6–11 are added and determined to be patentable.

*6. A method of selectively repelling animals having capsaicin sensitive receptors from eating treated birdseed, said method comprising in any order:*

(*i*) *exposing said treated birdseed to animals having capsaicin sensitive receptors; and*

(*ii*) *feeding said treated birdseed to birds;* said treated birdseed comprising:

(*a*) *birdseed selected from the group consisting of sunflower seeds, millet, barley, oats, wheat, corn,*

*peanuts, thistle seed, sorghum, sudan grass seed, watergrass seed, clover seed and mixtures thereof; and*

(*b*) *a material containing capsaicin or a derivative of an analogue thereof coated on, impregnated in or mixed with said birdseed in an effective amount within the ratio of about 1 part in 200 to about 1 part in 100,000 by weight to repel animals having capsaicin sensitive receptors from eating said treated birdseed, with the proviso that said treated birdseed does not have effective amounts of other ingredients that would repel birds.*

*7. The method according to claim 6 wherein said animals having capsaicin sensitive receptors are rodents.*

*8. The method according to claim 7 wherein said rodents are selected from the group consisting of squirrels, mice and rats.*

*9. The method according to claim 6 wherein said birds are wild birds.*

*10. The method according to claim 6 wherein said capsaicin derivative or analogue is dihydrocapsaicin.*

*11. The method according to claim 6 wherein said materal containing capsaicin or a derivative or analogue thereof is an extract or whole plant material from a pepper of the genus Capsicum.*

* * * * *